United States Patent
You et al.

(10) Patent No.: US 9,165,256 B2
(45) Date of Patent: Oct. 20, 2015

(54) EFFICIENT PREDICTION

(71) Applicant: MOTOROLA MOBILITY LLC, Libertyville, IL (US)

(72) Inventors: Di You, Palatine, IL (US); Paul C. Davis, Arlington Heights, IL (US); Jianguo Li, Chicago, IL (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 225 days.

(21) Appl. No.: 14/017,495

(22) Filed: Sep. 4, 2013

(65) Prior Publication Data

US 2015/0032682 A1    Jan. 29, 2015

Related U.S. Application Data

(60) Provisional application No. 61/857,285, filed on Jul. 23, 2013.

(51) Int. Cl.
| | | |
|---|---|---|
| *G06F 9/44* | (2006.01) | |
| *G06N 7/02* | (2006.01) | |
| *G06N 7/06* | (2006.01) | |
| *G06N 7/00* | (2006.01) | |

(52) U.S. Cl.
CPC .................................. *G06N 7/005* (2013.01)

(58) Field of Classification Search
USPC ......................................................... 706/52
See application file for complete search history.

(56) References Cited

U.S. PATENT DOCUMENTS

| | | | | |
|---|---|---|---|---|
| 7,020,642 | B2* | 3/2006 | Ferguson et al. | 706/21 |
| 7,054,847 | B2* | 5/2006 | Hartman et al. | 706/12 |
| 7,480,640 | B1* | 1/2009 | Elad et al. | 706/14 |
| 7,599,897 | B2* | 10/2009 | Hartman et al. | 706/15 |
| 8,346,593 | B2* | 1/2013 | Fanelli et al. | 705/7.29 |
| 8,554,653 | B2* | 10/2013 | Falkenborg et al. | 705/35 |
| 8,605,795 | B2* | 12/2013 | Wang et al. | 375/240.26 |
| 8,606,681 | B2* | 12/2013 | O'Rourke | 705/36 R |
| 8,943,015 | B2* | 1/2015 | Davis et al. | 706/54 |
| 2013/0166494 | A1* | 6/2013 | Davis et al. | 706/54 |
| 2013/0166605 | A1* | 6/2013 | Li et al. | 707/803 |
| 2013/0166609 | A1* | 6/2013 | Hao et al. | 707/804 |
| 2015/0032682 | A1* | 1/2015 | You et al. | 706/52 |

OTHER PUBLICATIONS

Contribution-based approach for feature selection in linear programming-based models, Chalasani, V.; Beling, P.A. Systems, Man, and Cybernetics, 2000 IEEE International Conference on Year: 2000, vol. 3 pp. 1939-1943 vol. 3, DOI: 10.1109/ICSMC.2000.886397.*

(Continued)

*Primary Examiner* — Michael B Holmes
(74) *Attorney, Agent, or Firm* — Remarck Law Group PLC (57) ABSTRACT

Disclosed are a system and method for constructing and using a predictive model to generate a prediction signal, also referred to as a classification signal when the signal indicates one of a plurality of distinct classes. In various embodiments, the disclosed technique reduces a size of a predictive Support Vector Model by extracting certain values beforehand and storing only weighting values. The technique does not sacrifice generalization performance but does significantly reduce the model size and accelerate prediction performance. The described system applies to most kernel functions, whether linear or nonlinear.

20 Claims, 4 Drawing Sheets

(56) References Cited

OTHER PUBLICATIONS

Data Understanding using Semi-Supervised Clustering, Bhatnagar, V.; Dobariyal, R.; Jain, P.; Mahabal, A. Intelligent Data Understanding (CIDU), 2012 Conference on Year: 2012 pp. 118-123, DOI: 10.1109/CIDU.2012.6382192.*

Classifying Connectivity Graphs Using Graph and Vertex Attributes, Richiardi, J.; Achard, S.; Bullmore, E.; Van De Ville, D. Pattern Recognition in NeuroImaging (PRNI), 2011 International Workshop on Year: 2011 pp. 45-48, DOI: 10.1109/PRNI.2011.18.*

Comparing the partitional and density based clustering algorithms by using WEKA tool, Jenitha, G.; Vennila, V. Current Trends in Engineering and Technology (ICCTET), 2014 2nd International Conference on Year: 2014 pp. 328-331, DOI: 10.1109/ICCTET.2014.6966310.*

Pegasos: Primal Estimated sub-GrAdient SOlver for SVM, Shwartz et al., Published in 2007, p. 6, http://eprints.pascal-network.org/archive/00004062/01/ShalevSiSr07.pdf.

Efficient Face Detection by a Cascaded Support Vector Machine Expansion, Romdhani et al., Published in 2004, p. 2-4, http://cms.brookes.ac.uk/staff/PhilipTorr/Papers/SamiRoySoc/proceedingA.pdf.

Yang, Yiming et al.: "A Comparative Study on Feature Selection in Text Categorization", International Conference on Machine Learning, 1997, all pages.

Zhan, Yiqiang et al.: "Design efficient support vector machine for fast classification", Pattern Recognition, 38:157-161, 2007.

Kramer Kurt A., et al.: "Fast Support Vector Machines for Continuous Data", IEEE Transactions on Systems, Man, and Cybernetics, Part B: Cybernetics, 39(4): 2009, 989-1001, all pages.

Guyon, Isabelle et al.: "Gene Selection for Cancer Classification using Support Vector Machines", Machine Learning, Kluwer Academic Publishers, Manufactured in the Netherlands, 46:(389-422), 2002.

Burges, Chris J.C., et al.: "Improving the Accuracy and Speed of Support Vector Machines", Advances in Neural Information Processing Systems 9, 1997, all pages.

Osuna, Edgar et al.: "Reducing the run-time complexity of Support Vector Machines", International Conference on Pattern Recorgnition, Brisbane, Australia, Aug. 16-20, 1998, all pages.

Dong, Jianxiong et al.: "Effective Shrinkage of Large Multi-class Linear SVM Models for Text Categorization", International Conference on Pattern Recognition, 2008, all pages.

Chris J.C. Burges: "Simplified Support Vector Decision Rules", International Conference on Pattern Recognition, 1998, all pages.

\* cited by examiner

EFFICIENT PREDICTION

RELATED APPLICATION

The present application claims priority to U.S. Provisional Patent Application 61/857,285, filed on Jul. 23, 2013, which is incorporated herein by reference in its entirety.

TECHNICAL FIELD

The present disclosure is related generally to prediction based on a predictive model and, more particularly, to a system and method for providing a compact prediction model.

BACKGROUND

Modern electronic devices such as cellular telephones, smart phones, tablets, and so on are increasingly capable of customizing their behavior to accommodate particular environments or situations. For example, a device that is being used while in a moving vehicle may behave differently than a device that is being used in a stationary location. However, such devices seldom have direct knowledge of their usage environment, and as such, the environment may need to be inferred or predicted based on other factors.

While current prediction models may allow some predictions to be made, such models are generally insufficient. For example, while it may be possible to efficiently encode models to solve linear problems, e.g., via linear regression, there is no suitable general solution to efficiently encode models to be used at the prediction phase in both linear and nonlinear systems.

The present disclosure is directed to a system that may exhibit numerous distinctions or advantages over prior systems. However, it should be appreciated that any particular distinction or advantage is not a limitation on the scope of the disclosed principles nor of the attached claims, except to the extent expressly noted. Additionally, the discussion of any problem in this Background section is not an indication that the problem represents known prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

As noted above, there is currently no suitable general solution to efficiently encode models for use at the prediction phase in both linear and nonlinear systems. The most widely used technique to solve complex optimization is to construct Support Vector Machines ("SVMs"). SVMs have been used for many applications due to their generalization performance and strong theoretical foundation. While the topic of efficient algorithms for training SVMs has been touched on in the literature, utilization of SVMs in the testing and prediction phase has not been resolved.

Currently, a saved SVM model is used to predict subsequent incoming new data in the testing phase. However, if the model is very large due to the large number of support vectors (the data points representing the classification boundary) and features, then there is a high space requirement, prohibiting the use of SVMs in resource-constrained environments. Moreover, a large model leads to longer prediction time, imposing another obstacle with respect to real-world SVM applications. While it may be possible in certain circumstances to reduce the number of support vectors in the model, a prohibitive number of support vectors may nonetheless remain in the model (e.g., when the number of training samples is large). Moreover, such approaches sacrifice the SVM generalization accuracy in order to reduce the model size. The resulting SVM performance greatly depends on the extent of support vector reduction.

The disclosed principles provide a technique for efficiently encoding a model for use in prediction in both linear and non-linear problem spaces. In general terms, this technique does not sacrifice generalization performance while still significantly reducing the model size and making accelerating prediction performance. Essentially, the described techniques ensure generalization performance by maintaining all features while making the model size significantly smaller. Furthermore, while many existing approaches are limited to linear SVM, the described system functions with most kernel functions, whether linear or nonlinear.

The model in many embodiments does not store any support vectors and associated coefficients; rather, it only stores the weight vector coefficients in the kernel space, making the model size very small. In addition, the technique can be applied even to more complex kernels by adding approximation methods, making the technique suitable even for advanced SVM algorithms. Thus, the disclosed principles are capable of providing reduced model size and accelerated prediction.

While the disclosed principles are discussed by reference to SVMs, it will be appreciated that the disclosed approach is applicable to any linear, or kernel-based nonlinear, regression task, since the prediction function in this case is the same as that in SVM classification. Some exemplary alternative applications include ridge regression, support vector regression, and so on.

Figure 1:
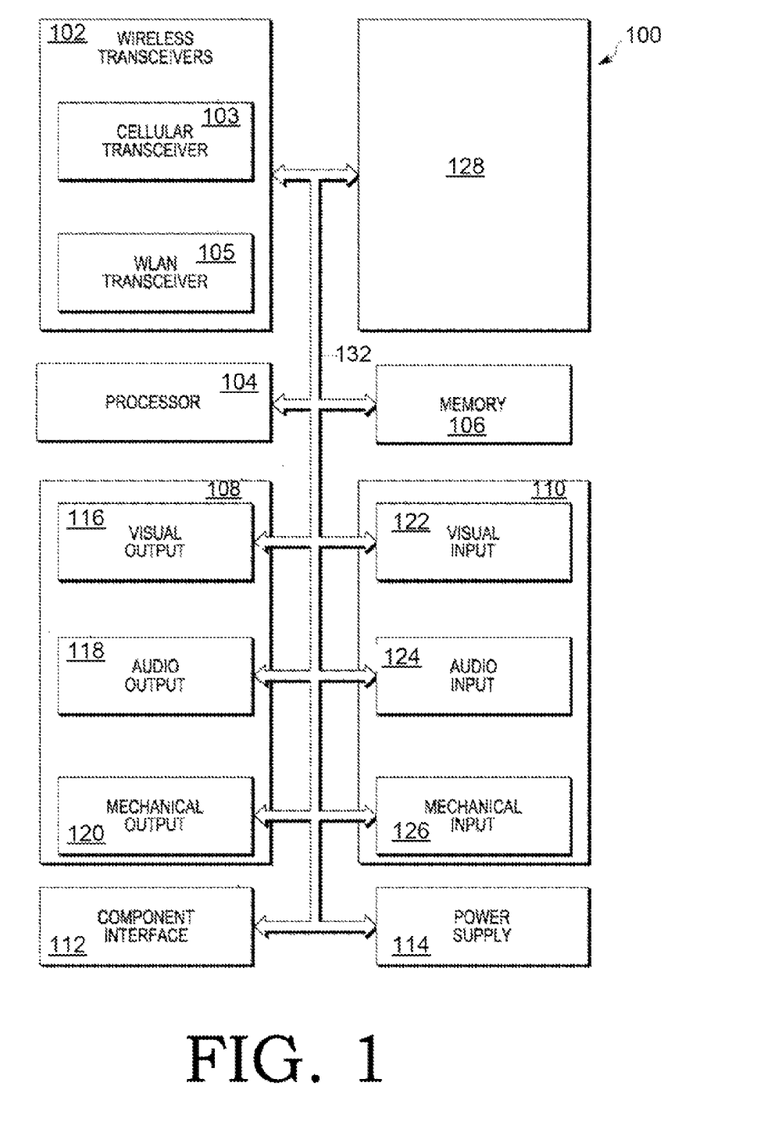
FIG. 1 is a schematic illustration of an example device within which embodiments of the disclosed principles may be implemented.

Turning now to a more detailed description in view of the attached figures, the schematic diagram of FIG. 1 shows an exemplary device within which aspects of the present disclosure may be implemented. In particular, the schematic diagram 100 illustrates exemplary internal components of a mobile smart phone implementation of a small touch-screen device. These components can include wireless transceivers 102, a processor 104, a memory 106, one or more output components 108, one or more input components 110, and one or more sensors 128. The processor 104 may be any of a microprocessor, microcomputer, application-specific integrated circuit, or the like. Similarly, the memory 106 may, but need not, reside on the same integrated circuit as the processor 104.

The device can also include a component interface 112 to provide a direct connection to auxiliary components or accessories for additional or enhanced functionality and a power supply 114, such as a battery, for providing power to the device components. All or some of the internal components may be coupled to each other, and may be in communication with one another, by way of one or more internal communication links 132, such as an internal bus.

The memory 106 can encompass one or more memory devices of any of a variety of forms, such as read-only memory, random-access memory, static random-access memory, dynamic random-access memory, etc., and may be used by the processor 104 to store and retrieve data. The data that are stored by the memory 106 can include one or more operating systems or applications as well informational data. Each operating system is implemented via executable instructions stored in a storage medium in the device that controls basic functions of the electronic device, such as interaction among the various internal components, communication with external devices via the wireless transceivers 102 or the component interface 112, and storage and retrieval of applications and data to and from the memory 106.

With respect to programs, sometimes also referred to as applications, each program is implemented via executable code that utilizes the operating system to provide more specific functionality, such as file system service and handling of protected and unprotected data stored in the memory 106. Although many such programs govern standard or required functionality of the small touch-screen device, in many cases the programs include applications governing optional or specialized functionality, which can be provided in some cases by third-party vendors unrelated to the device manufacturer.

Finally, with respect to informational data, this non-executable code or information can be referenced, manipulated, or written by an operating system or program for performing functions of the device. Such informational data can include, for example, data that are preprogrammed into the device during manufacture or any of a variety of types of information that are uploaded to, downloaded from, or otherwise accessed at servers or other devices with which the device is in communication during its ongoing operation.

The device can be programmed such that the processor 104 and memory 106 interact with the other components of the device to perform a variety of functions, including interaction with the touch-detecting surface to receive signals indicative of gestures therefrom, evaluation of these signals to identify various gestures, and control of the device in the manners described below. The processor 104 may include various modules and execute programs for initiating different activities such as launching an application, data-transfer functions, and the toggling through various graphical user interface objects (e.g., toggling through various icons that are linked to executable applications).

The wireless transceivers 102 can include, for example as shown, both a cellular transceiver 103 and a wireless local area network transceiver 105. Each of the wireless transceivers 102 utilizes a wireless technology for communication, such as cellular-based communication technologies including analog communications, digital communications, and next generation communications or variants thereof, peer-to-peer or ad hoc communication technologies such as HomeRF, Bluetooth and IEEE 802.11 (a, b, g, or n), or other wireless communication technologies.

Exemplary operation of the wireless transceivers 102 in conjunction with other internal components of the device can take a variety of forms and can include, for example, operation in which, upon reception of wireless signals, the internal components detect communication signals and one of the transceivers 102 demodulates the communication signals to recover incoming information, such as voice or data, transmitted by the wireless signals. After receiving the incoming information from one of the transceivers 102, the processor 104 formats the incoming information for the one or more output components 108. Likewise, for transmission of wireless signals, the processor 104 formats outgoing information, which may or may not be activated by the input components 110, and conveys the outgoing information to one or more of the wireless transceivers 102 for modulation as communication signals. The wireless transceivers 102 convey the modulated signals to a remote device, such as a cell tower or an access point (not shown).

The output components 108 can include a variety of visual, audio, or mechanical outputs. For example, the output components 108 can include one or more visual-output components 116 such as a display screen. One or more audio-output components 118 can include a speaker, alarm, or buzzer, and one or more mechanical-output components 120 can include a vibrating mechanism, for example. Similarly, the input components 110 can include one or more visual-input components 122 such as an optical sensor of a camera, one or more audio-input components 124 such as a microphone, and one or more mechanical-input components 126 such as a touch-detecting surface and a keypad.

The sensors 128 can include an accelerometer, a gyroscope, any haptic, light, temperature, biological, chemical, or humidity sensor, or any other sensor that can provide pertinent information, such as to identify a current location of the device. Actions that can actuate one or more input components 110 can include for example, powering on, opening, unlocking, moving, or operating the device. For example, upon power on, a "home screen" with a predetermined set of application icons can be displayed on the touch screen.

One task that may be accomplished for various reasons at various times by a device such as that shown in FIG. 1 is predictive modeling, e.g., to predict a variable or class of interest given collected data known or believed to be result-effective. For example, it may be undesirable to force a user to indicate manually whenever the device environment changes, e.g., from being handheld during walking to being pocketed during driving and so on. Nonetheless, the device designer or an application developer may wish to change device or application behavior based on which of these two situations accurately describes the current device environment. In such a case, it is beneficial to obtain the values of result-effective variables such as speed, noise, and so on, and to predict the device environment on that basis.

However, mobile electronic devices are significantly resource-constrained with respect to memory and processing power. Although device capabilities continue to advance rapidly, the requirements placed on such devices are also expanding rapidly. Thus, accurate and rapid predictive modeling remains difficult to implement in such devices.

In an embodiment of the disclosed principles, these hurdles to effective predictive modeling in small mobile devices are overcome via a technique that precomputes values that are needed during the prediction phase. This technique can be used for both linear and non-linear systems and significantly reduces model size since only single values for features need be stored, eliminating the need to store thousands of examples with values for each feature.

Moreover, for problems that can be optimally decided with linear or polynomial kernels, the precomputation is lossless, producing the same optimal accuracy as a non-precomputed solution. For problems requiring more complicated kernels, such as radial basis function ("RBF") kernels, an approximation technique is employed, which for many problem spaces will provide a very close approximation to the optimal solution. This technique allows one to use significant computation resources, data, and techniques to create prediction technologies (e.g., classifiers), that are very accurate (even optimal in some cases), and then deploy them in severely resource-constrained environments.

Figure 2:
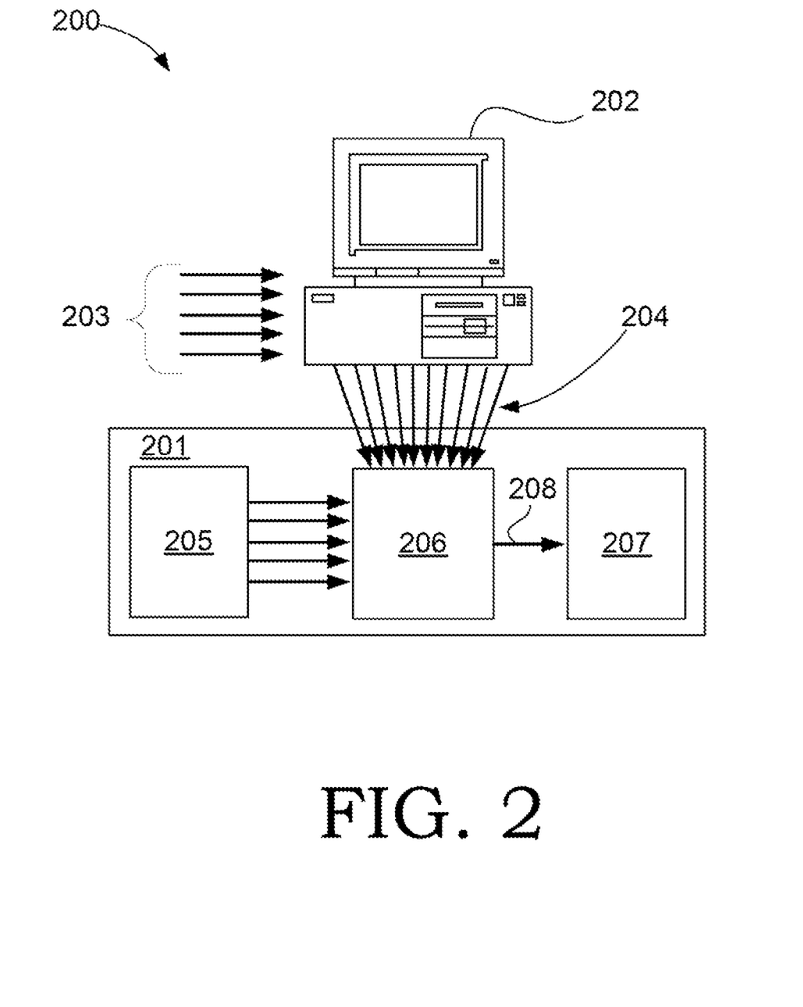
FIG. 2 is a schematic illustration of an environment within which embodiments of the disclosed principles may be implemented.

Before discussing the disclosed technique in detail, an example of an implementation environment is given to provide the reader with context within which to understand the subsequent examples. The simplified plan view shown in FIG. 2 represents an example environment via which the presently disclosed techniques may be implemented. The illustrated example environment 200 includes a resource-constrained electronic device 201, which may be, for example, a cellular telephone, a smart phone, a tablet, and so on. The resource-constrained electronic device 201 includes an input-sensor group 205, a processor 206, and an application or module 207 that makes use of the prediction results.

The input-sensor group includes one or more sensors including, for example, a location sensor (e.g., GPS), one or more movement sensors (e.g., accelerometers, gyroscopes, and so on), a light sensor, and an audible sensor. It will be appreciated that the sensor group 205 may include additional or alternative sensors and that the given sensors may provide multiple sensed values. For example, a GPS module may provide both location and movement data.

A resource-rich computing device 202 is shown in communication with the resource-constrained electronic device 201. The resource-rich computing device 202 may be, for example, a laptop computer, a desktop computer, a workstation, and so on. In practice, the resource-rich computing device 202 is used to precompute model values for a computationally expensive and accurate prediction model. In an embodiment, the computationally expensive and accurate prediction model is one which makes use of SVMs, although other model types are usable as well. As a reminder, SVMs are support vector machines, which use support vectors to define a decision or classification surface. Support vectors can be viewed as elements of the training set whose removal would change the position of the decision surface.

In the illustrated environment, the resource-rich computing device 202 receives a training set 203 of training vectors, which may be calculated or empirical. The resource-rich computing device 202 processes the training set 203 to generate model values 204 and provides these model values 204 to the processor 206 of the resource-constrained electronic device 201.

In operation, the processor 206 of the resource-constrained electronic device 201 receives sensed environment and device-condition parameters from the sensor group 205. In order to classify the received data as indicating a first condition (e.g., phone in use while walking) or a second condition (e.g., phone idle and moving in vehicle), the processor 206 of the resource-constrained electronic device 201 implements a prediction algorithm such as one employing SVMs, while applying the model values 204 received from the resource-rich computing device 202. The result of the model is output as a prediction or classification value 208 to the application or module 207 that makes use of the prediction results.

The application or module 207 that makes use of the prediction results may be, for example, an operating system function that manages device power usage based on the predicted environment. In another example, the application or module 207 that makes use of the prediction results is an application that provides a service, such as alert muting or volume management based on the predicted environment.

The SVM prediction function is:

$$y(z) = \sum_{i=1}^{n} w_i^\varphi z_i^\varphi, \quad (1)$$

where w is the ith feature of the weight vector in a kernel space induced by the kernel function $\phi(.)$ and $z_i^\phi$ is the ith feature of the test sample in the kernel space.

Since after the kernel mapping, the weight vector and test sample become implicit, the prediction function may be rewritten as $$y(z) = \sum_{i=1}^{n} \alpha_i y_i k(x_i, z),$$

where $\alpha i$ is the coefficient, xi is the support vector, yi is the label of $x_i$, and k(.,.) is the kernel function. If the prediction model is saved at this point by storing all the support vectors, coefficients, and class labels, then this leads to a large model size.

However, in an embodiment, the weight vector is explicitly calculated in the kernel space rather than implicitly reformulating the prediction function. By obtaining the explicit weight vector coefficients in the kernel space, only these coefficients need be stored, yielding a small and efficient model.

For example, consider the case of a typical kernel function. For a linear kernel, i.e., $k(x_i, z) = x_i^T z$, this yields:

$$y(z) = \sum_i \alpha_i y_i x_i^T z$$

$$= \sum_i \alpha_i y_i \left( \sum_j x_{ij} z_j \right)$$

$$= \sum_j z_j \left( \sum_i \alpha_i y_i x_{ij} \right)$$

So $$\left( \sum_i \alpha_i y_i x_{ij} \right)$$

can be precalculated and stored for each zj, i.e., each feature.

In the case of a polynomial kernel, the general form is $k(x_i, z) = a(x_i^T z + b)^p$. We may assume, for the sake of example, that a=1, b=0. For simplicity, let p=2, with the understanding that the reduction in model size also holds for general p.

$$y(z) = \sum_i \alpha_i y_i (x_i^T z)^2$$

And assume two features of interest, then $$y(z) = \sum_i \alpha_i y_i (x_{i1} z_1 + x_{i2} z_2)^2$$

$$= \sum_i \alpha_i y_i (x_{i1}^2 z_1^2 + 2 x_{i1} x_{i2} z_1 z_2 + x_{i2}^2 z_2^2)$$

$$= z_1^2 \sum_i \alpha_i y_i x_{i1}^2 + z_2^2 \sum_i \alpha_i y_i x_{i2}^2 + 2 z_1 z_2 \sum_i \alpha_i y_i x_{i1} x_{i2}$$

Given this, $$\sum_i \alpha_i y_i x_{i1}^2, \sum_i \alpha_i y_i x_{i2}^2 \text{ and } \sum_i \alpha_i y_i x_{i1} x_{i2}$$

can be precalculated and stored for each term. As a result, only three values for each of two features need be stored. For a greater number of features, the Multinomial theorem may be used, but the end result is the same, that is, a dramatic reduction in model size due to the need to store fewer values with the model.

In the case of an RBF kernel, $$k(x_i, z) = e^{-r\|x_i - z\|^2} = e^{-r(x_i^T x_i - 2 x_i^T z + z^T z)}.$$

Note that it is difficult to factor out z due to the exponential term, but a Taylor expansion may be applied in this case to approximate the original function and to remove the exponential term. The Taylor expansion for e−rx is:

$$e^{-rx} = 1 - rx + \frac{r^2 x^2}{2} - \frac{r^3 x^3}{6} + O(x^4), \quad (2)$$

and the term $O(x^k)$ may be ignored since it denotes the higher order terms which are generally very small.

For most applications, a second order or third order solution is a sufficient approximation. Substituting Equation (2) into the kernel function defined above, the problem reverts to one that is similar to that associated with a polynomial kernel, and the model can also now be simplified in a similar fashion.

As can be seen, the disclosed principles are applicable to simplify models based on linear, polynomial, and RBF kernels. In each case, the model need not store any support vectors, and as such, the model size depends only on the number of features of the data points in the mapped space. Although an approximation is used in the case of RBF kernels, the loss of accuracy is very small, and the described approach does not sacrifice any generalization performance while reducing the model size and making the prediction faster.

In essence, the described approach assures that generalization performance is maintained despite the model reduction process. Furthermore, while most existing approaches only work for linear SVM, the described principles apply to most popularly used kernel functions, whether linear or nonlinear. As noted above, although the disclosed principles are exemplified herein by the use of SVMs, the described approach is applicable to any linear or kernel-based nonlinear regression task, since the prediction function in such cases is the same as that in SVM classification. Some such alternative applications include ridge regression, support vector regression, and so on.

The described technique may be used to provide solutions to any of a number of prediction problems for the mobile device 201. While the device may not always be in a full power state, the described prediction technique can be used for classification and prediction running on low-powered sensors, chipsets, and processors. For example, the described technique may provide an efficient classifier to run on a digital signal processor ("DSP"), employing constant passive audio sensing to predict whether the device is in a running automobile, e.g., via the gathered noise data. This example can be extended to a number of other use cases and may also utilize sensor signals in addition to audio. For example, more generally, the described techniques may be used to predict a user's context and state, such as mood, activity, etc.

Because of the compact model size provided by the disclosed principles, a number of such classifiers may be deployed simultaneously without incurring substantial computational overhead. This makes the described technique readily applicable for use in the DSP, sensor hub, watch, glass, and similar resource-constrained environments.

Figure 3:
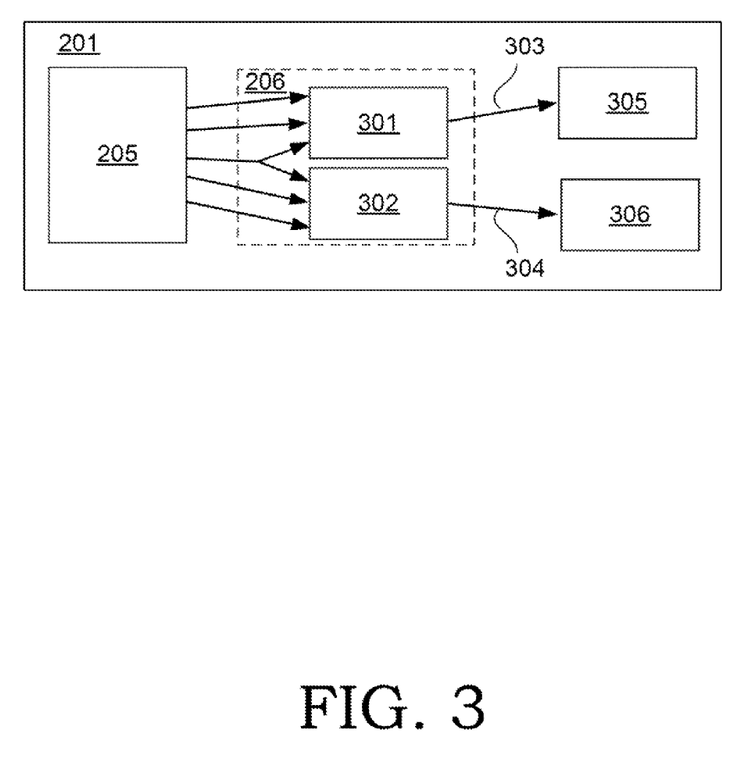
FIG. 3 is an architectural illustration showing an arrangement of functional modules in accordance with an embodiment of the disclosed principles.

Turning to FIG. 3, a schematic illustration of the mobile electronic device 201 is shown in greater detail, in an environment in which the device 201 is running multiple predictive models according to the described principles. In particular, the processor 206 of the device 201 is shown running multiple reduced predictive models 301, 302 of the type described above to provide a respective prediction or classification 303, 304 to the subscriber modules or applications 305, 306.

The sensor group 205 provides input data for each reduced predictive model 301, 302. Although not required, some or all sensed data may be shared by the reduced predictive models 301, 302. In the illustrated example, one sensed quantity, e.g., noise, light, location, etc., is an input to both reduced predictive models 301, 302, while the remaining sensed quantities are input to one or the other of the reduced predictive models 301, 302.

Figure 4:
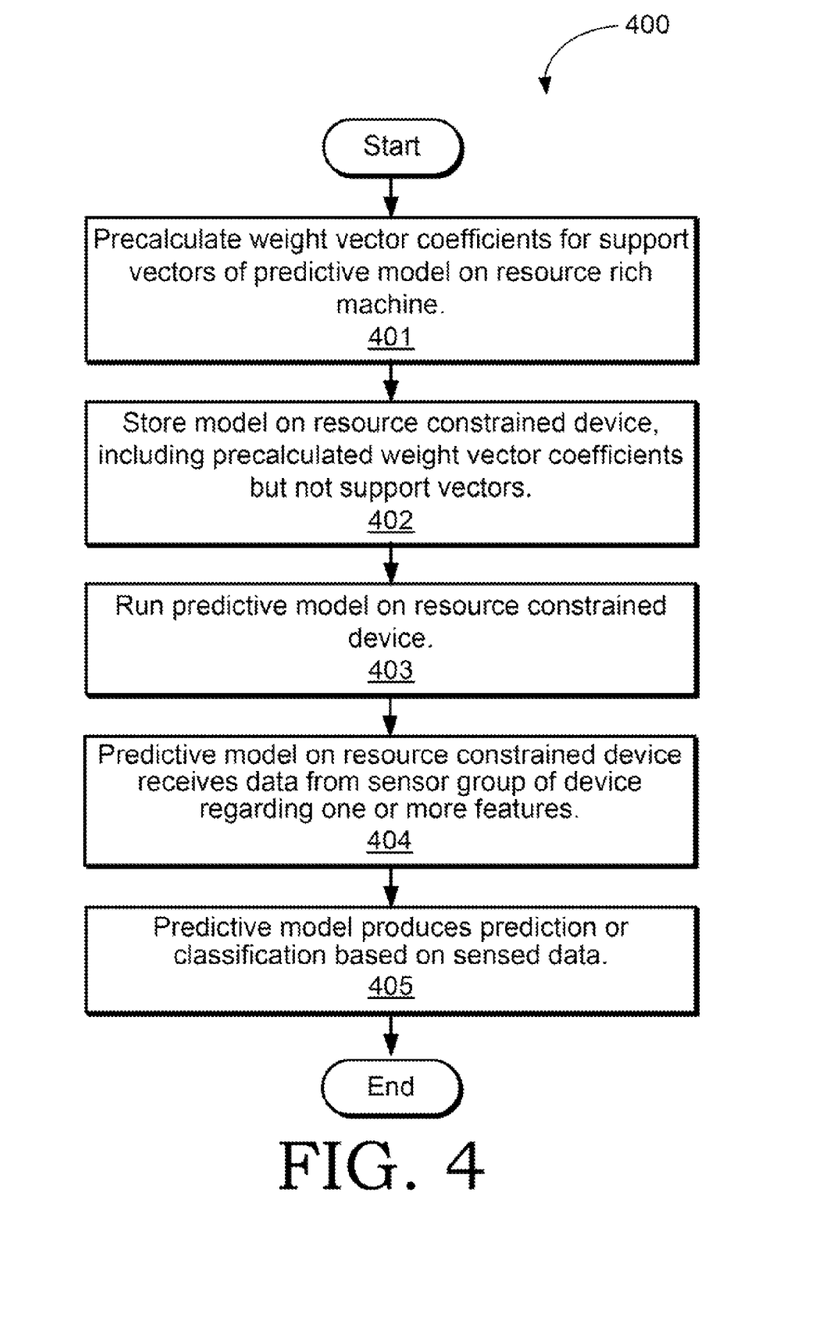
FIG. 4 is a flowchart showing a process of predictive modeling and application in accordance with the disclosed principles.

Although the precise process for applying the reduced predictive model architecture disclosed herein may vary from implementation to implementation, an exemplary process is illustrated in the flowchart of FIG. 4. The illustrated process 400 operates in the context of a device as shown in FIGS. 2 and 3, however it will be appreciated that the process 400 may be applied as is or with hardware-dependent variations to numerous other types of resource-constrained electronic devices.

At stage 401 of the process 400, the weight vector coefficients for support vectors of a predictive model are precalculated on a resource-rich machine such as a desktop or laptop computer. The model is then stored on a resource-constrained device at stage 402. The stored model includes the precalculated weight vector coefficients for the support vectors but does not include the support vectors themselves.

At stage 403, the resource-constrained device runs the predictive model. The model may be run on demand or continuously depending upon its purpose and upon device constraints. While running, the predictive model receives data regarding one or more features from a sensor group of the device at stage 404. As noted above, features may pertain to any sensed quantity that is result-effective within the model, e.g., sound, light, vibration, location, and so on.

Based on the sensed data, the predictive model produces, at stage 405, a prediction or classification. For example, the predictive model may be one that predicts device location with respect to a vehicle or a user, or that predicts any other condition that is not directly readable by the device but that may be predicted or inferred based on selected features. For example, the described techniques may be used to predict a user's context and state, such as mood, activity, etc.

While the foregoing example focuses on SVMs, it will be appreciated that the described system and process are applicable to a wide variety of predictive applications as noted above. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of generating a classification indicator on an electronic device based on a predictive model, the electronic device comprising a device-sensor group for sensing data related to an environment of the electronic device, the method comprising:
   generating one or more respective weight vector coefficients for one or more support vectors of the predictive model on a computing device remote from the electronic device;
   storing the predictive model including the one or more respective weight vector coefficients but excluding the support vectors on the electronic device;
   running the predictive model on the electronic device based on the weight vector coefficients and input received from the device-sensor group;
   generating a classification decision based on running the predictive model; and
   generating a classification indicator to modify a behavior of the electronic device.

2. The method of claim 1 wherein the electronic device is one of a cellular phone, a smart phone, and a tablet computer.

3. The method of claim 1 wherein generating one or more respective weight vector coefficients comprises approximating a radial basis function kernel.

4. The method of claim 1 wherein the predictive model is associated with one of a linear kernel and a nonlinear kernel.

5. The method of claim 1 wherein the classification indicator represents a current state or activity of the electronic device or of a user.

6. The method of claim 1 wherein running the predictive model on the electronic device comprises running multiple predictive models on the electronic device.

7. The method of claim 1 wherein the classification decision represents a mood, activity, or environment of a user.

8. The method of claim 1 wherein the predictive model is a polynomial model.

9. The method of claim 1 wherein generating a classification indicator to modify a behavior of the electronic device comprises generating a classification indicator signaling that a user is not present at the electronic device.

10. An electronic device for generating a classification indicator based on a predictive model, the device comprising:
    a device-sensor group for sensing data related to an environment of the electronic device;
    a memory wherein is stored a predictive model including one or more respective weight vector coefficients for one or more support vectors of the predictive model; and
    a processor configured to receive data from the device-sensor group and to run the predictive model based on the weight vector coefficients and the received data and to generate a classification indicator to modify the behavior of the electronic device.

11. The electronic device of claim 10 wherein the electronic device is one of a cellular phone, a smart phone, and a tablet computer.

12. The electronic device of claim 10 wherein the processor is further configured to generate the one or more respective weight vector coefficients by approximating a radial basis function kernel.

13. The electronic device of claim 10 wherein the predictive model is a polynomial kernel.

14. The electronic device of claim 10 wherein the classification indicator represents a current state or activity of the electronic device or of a user.

15. The electronic device of claim 10 wherein the processor is further configured to run multiple predictive models on the electronic device.

16. The electronic device of claim 10 wherein the predictive model is linear.

17. The electronic device of claim 10 wherein the predictive model is non-linear.

18. A method of making a prediction at an electronic device, the method comprising:
    producing a model including a plurality of result-effective features and one or more support vectors;
    generating one or more respective weight vector coefficients for the one or more support vectors;
    storing the model, including the one or more respective support vector weight coefficients but not the one or more support vectors, in the electronic device; and
    outputting a prediction signal from at least a portion of the electronic device.

19. The method of claim 18 wherein the electronic device is one of a cellular phone, a smart phone, and a tablet computer.

20. The method of claim 18 wherein the prediction signal represents a user mood, activity, or environment.

* * * * *